United States Patent
Meinl et al.

(10) Patent No.: US 10,444,447 B2
(45) Date of Patent: Oct. 15, 2019

(54) ASSEMBLY AND METHOD FOR ALIGNING A LIGHT BEAM

(71) Applicant: SCHOTT AG, Mainz (DE)

(72) Inventors: Juergen Meinl, Hohenstein-Holzhausen (DE); Steffen Astheimer, Hünstetten (DE)

(73) Assignee: SCHOTT AG, Mainz (DE)

( * ) Notice: Subject to any disclaimer, the term of this patent is extended or adjusted under 35 U.S.C. 154(b) by 64 days.

(21) Appl. No.: 15/701,610

(22) Filed: Sep. 12, 2017

(65) Prior Publication Data

US 2018/0074269 A1    Mar. 15, 2018

(30) Foreign Application Priority Data

Sep. 13, 2016  (DE) .......................... 10 2016 117 202
Dec. 23, 2016  (DE) .......................... 10 2016 125 632

(51) Int. Cl.

| G02B 6/36 | (2006.01) |
|---|---|
| G02B 6/42 | (2006.01) |
| G02B 6/38 | (2006.01) |
| G02B 6/32 | (2006.01) |
| G02B 7/02 | (2006.01) |
| G02B 23/24 | (2006.01) |
| G02B 27/30 | (2006.01) |

(52) U.S. Cl.
CPC ............ *G02B 6/4226* (2013.01); *G02B 6/32* (2013.01); *G02B 6/3874* (2013.01); *G02B 6/423* (2013.01); *G02B 6/424* (2013.01); *G02B 6/4244* (2013.01); *G02B 6/4245* (2013.01); *G02B 7/023* (2013.01); *G02B 23/2469* (2013.01); *G02B 6/4204* (2013.01); *G02B 27/30* (2013.01)

(58) Field of Classification Search
None
See application file for complete search history.

(56) References Cited

U.S. PATENT DOCUMENTS

| 3,954,338 A * | 5/1976 | Hennel ................ G02B 6/3843 356/138 |
| 4,193,664 A * | 3/1980 | Ellwood .............. G02B 6/3843 385/65 |

(Continued)

FOREIGN PATENT DOCUMENTS

| DE | 3884767 | 2/1994 |
| DE | 102007061737 | 6/2009 |

(Continued)

*Primary Examiner* — Michelle R Connelly
(74) *Attorney, Agent, or Firm* — Ohlandt, Greeley, Ruggiero & Perle, L.L.P.

(57) ABSTRACT

An assembly and method for aligning a light beam that is exiting from a light source/guide are provided. The assembly includes an outer housing and an inner housing which is at least partially arranged inside the outer housing and is adjustably mounted to the outer housing. The inner housing accommodates and fixes the light source/guide such that the optical axis of the light beam is fixed relative to the longitudinal direction of the inner housing and such that different inclinations are adjustable between the longitudinal direction of the inner housing and the longitudinal direction of the outer housing in order to align the optical axis of the light beam relative to the longitudinal direction of the outer housing.

17 Claims, 3 Drawing Sheets

(56) References Cited

U.S. PATENT DOCUMENTS

| | | | |
|---|---|---|---|
| 4,431,267 A | 2/1984 | Finck | |
| 4,696,538 A * | 9/1987 | Despouys | G02B 6/3843 |
| | | | 385/139 |
| 4,767,188 A * | 8/1988 | Myer | G02B 7/004 |
| | | | 359/503 |
| 4,889,406 A * | 12/1989 | Sezerman | G02B 6/32 |
| | | | 385/35 |
| 4,918,702 A | 4/1990 | Kimura | |
| 5,095,517 A | 3/1992 | Monguzzi | |
| 5,584,569 A * | 12/1996 | Huang | F41G 1/545 |
| | | | 362/110 |
| 5,659,645 A * | 8/1997 | Satake | G02B 6/32 |
| | | | 385/33 |
| 5,668,899 A | 9/1997 | Jadrich | |
| 6,168,319 B1 | 1/2001 | Francis | |
| 6,276,843 B1 * | 8/2001 | Alcock | G02B 6/3874 |
| | | | 385/90 |
| 6,773,170 B1 * | 8/2004 | Georgiev | G02B 6/264 |
| | | | 385/90 |
| 6,801,688 B1 | 10/2004 | Stubbs | |
| 6,925,234 B2 * | 8/2005 | Alexeev | G02B 6/4219 |
| | | | 385/52 |
| 7,526,162 B1 * | 4/2009 | Grapov | G02B 6/32 |
| | | | 385/52 |
| 2003/0227634 A1 * | 12/2003 | Kobayashi | G02B 6/3807 |
| | | | 356/508 |
| 2004/0114873 A1 | 6/2004 | Alexeev | |
| 2006/0127012 A1 | 6/2006 | Barbarossa | |
| 2006/0268423 A1 | 11/2006 | Ho | |
| 2014/0016897 A1 * | 1/2014 | Glenn | G02B 6/32 |
| | | | 385/33 |

FOREIGN PATENT DOCUMENTS

| | | |
|---|---|---|
| WO | 2011026770 | 3/2011 |
| WO | 2012112146 | 8/2012 |

* cited by examiner

ASSEMBLY AND METHOD FOR ALIGNING A LIGHT BEAM

CROSS REFERENCE TO RELATED APPLICATIONS

This application claims benefit under 35 U.S.C. § 119(a) of German Application No. 10 2016 117 202.2 filed Sep. 13, 2016 and German Application No. 10 2016 125 632.3 filed Dec. 23, 2016, the entire contents of both of which are incorporated herein by reference.

BACKGROUND

1. Field of the Invention

The invention relates to an assembly and a method for aligning a light beam that is exiting from a light source or from a light guide.

2. Description of Related Art

Light beams that are exiting from a light guide or a light source, for example an optical fiber or a laser diode, usually exhibit divergent or diffuse beam characteristics. For many applications, however, focused or collimated light beams are required, so that an output beam is often shaped using optical lenses or sets of lenses. Beam shaping optics may be installed in an housing which is coupled to the end of a light guide, in the form of a plug, for example. Also, a housing with beam shaping optics may be used as a mounting support for installing a light source, e.g. a laser diode, especially for producing laser modules with predetermined beam characteristics.

U.S. Pat. No. 6,801,688 B1, for example, describes a collimator that receives light from an optical fiber and generates a collimated light beam at an increased specified diameter. The fiber optic collimator has a shuttle plug for receiving the optical fiber, and the shuttle plug is arranged to be movable in an axial direction in a collimator housing.

U.S. Pat. No. 6,168,319 B1 discloses a collimator assembly with an optical fiber and a graded-index lens, wherein the components are mounted within a thin tube. The distance between the fiber and the lens is varied so as to obtain a predefined beam width.

U.S. Pat. No. 4,431,267 describes an optical system for providing a collimated light beam, in which a semiconductor laser is positioned against an abutment in a tubular holder. A system of lenses can be moved against a pressure of a resilient element in direction of the laser, and when a collimated light beam is generated, a locking element is fixed so that the system of lenses is correctly adjusted.

In the case of collimators of the type described above, but also in systems of different types, e.g. in the case of fiber plugs, inaccuracies in the beam exit angle may arise due to the manufacturing tolerance of all components. Sometimes, the optical axis of the exiting light might be tilted relative to the mechanical housing axis, by about a few milliradians (mrad) or more. Since many applications require a beam that is aligned more accurately, it would be desirable to avoid such errors.

International patent application WO 2011/026770 A1 describes a collimation device which permits to adjust the direction of the beam. The assembly comprises a stationary plate supporting a beam source, and a movable plate on which a collimator optic is mounted.

International patent application WO 2012/112146 A1 describes a beam coupler assembly with a lens housing adjustment system that maintains the adjustment of the x- and y-axes while allowing movement in the z-direction with little effort.

However, the items disclosed in the aforementioned documents are configured for special requirements and are rather complex. In addition, they are not eligible for many applications.

SUMMARY

An object of the present invention is to align a light beam, in particular a collimated light beam, in a simple, cost-effective and at the same time in a highly precise manner, and in particular it is intended to provide for accuracies in a range of less than one milliradian.

One aspect of the object of the invention includes to align the optical axis of a light beam that is exiting from a light source or a light guide, relative to a housing to which the light source or the light guide is connected.

A further aspect of the object of the invention includes to enable an alignment of a light beam and a collimation that can be adjusted mechanically and independently in time therefrom.

The invention relates to an assembly for aligning a light beam that is exiting from a light source or a light guide. The assembly thus allows an adjustment of the beam direction of the light beam and thus of the optical axis along which the light beam propagates.

The assembly comprises an outer housing and an inner housing which is at least partially arranged therein. The outer housing and the inner housing both have in particular a tubular shape and define a longitudinal direction. Therefore, in particular a tubular housing is concerned, in which a further tubular housing is mounted.

The inner housing is designed to receive the light source or the light guide. The light source or the light guide can accordingly be inserted into the inner housing preferably along the longitudinal direction of the inner housing, at least partially. In the case of a light source, it may be contemplated that the light source is completely inserted into the inner housing.

The inner housing is furthermore designed to hold the light source or the light guide in fixed manner such that the optical axis of the light beam, i.e., the direction of the light beam, is fixed relative to the longitudinal direction of the inner housing. Accordingly, the optical axis of the light beam and the longitudinal direction of the inner housing have a fixed alignment to each other. They need not, but can be parallel to each other, for example. In order to achieve such a fixation, the light source or the light guide may have an outer diameter that corresponds to the inner diameter of the inner housing, for example.

In order to fix the light source or the light guide within the inner housing, it may be secured at a certain position along the longitudinal direction, for example. The light source or the light guide may thus be fixed against a displacement along the longitudinal direction of the inner housing.

The outer housing encloses and accommodates the inner housing. The inner housing is adjustably mounted to the outer housing, such that different inclinations are adjustable between the longitudinal direction of the inner housing and the longitudinal direction of the outer housing. Thus, the longitudinal direction of the inner housing is inclinable relative to the longitudinal direction of the outer housing. The different inclinations that can be adjusted between the longitudinal direction of the inner housing and the longitudinal direction of the outer housing generally also include the inclination of zero degree as the initial position, which means that the two longitudinal directions are parallel.

The various adjustable inclinations are preferably not only in one plane. Rather, the longitudinal direction of the inner housing can be adjusted obliquely in space relative to the longitudinal direction of the outer housing.

By inclining the inner housing relative to the outer housing, more specifically their longitudinal directions relative to each other, it is possible to align the optical axis of the light beam relative to the longitudinal direction of the outer housing. Often, it is desirable that the optical axis of the light beam runs very precisely in parallel to or coaxially with the longitudinal direction of the outer housing.

Preferably, a lens or a lens system is mounted or mountable in or on the inner housing to cause beam shaping of the light beam, in particular collimation of the light beam. Preferably, the lens or lens system is fixedly connected to the inner housing.

A lens or a lens system may in particular be fixed on the opposite end of the inner housing where the light source or the light guide is inserted. The light source or the light guide may be displaceable relative thereto along the longitudinal direction of the inner housing, in particular before being fixed, so that different types of beam shaping of the light beam by the lens or the lens system are adjustable and a specific beam shaping can be selected.

Accordingly, the inner housing is preferably configured to fixedly support the light source or the light guide at different positions along the longitudinal direction of the inner housing. For example, it may be contemplated that the inner housing has a fastening point at a specific position along its longitudinal direction and the light source or the light guide is fixed to the fastening point when the light source or the light guide is inserted into the inner housing to this point or is positioned by being displaced along the longitudinal direction of the inner housing as required to achieve the desired beam shaping, e.g. a collimation, by the lens or the lens system.

It may be contemplated that the inner housing is permanently connectable to the light source or to the light guide, in particular to permanently fix the light source or the light guide at a specific position along the longitudinal direction of the inner housing. Permanent fixation can be achieved by gluing, clamping, screwing, or the like, for example.

An angular alignment of the light beam, i.e. an adjustment of the beam direction, can in particular be performed when the light source or the light guide is fixed to the inner housing.

For this purpose, one or more adjustable adjusting elements may be provided, which can be used to adjust the different inclinations between the longitudinal direction of the inner housing and the longitudinal direction of the outer housing. The adjusting elements may, for example, each extend radially through a tubular wall of the outer housing and press against the inner housing.

It may be contemplated that the inner housing is permanently connectable to the outer housing such that a specific inclination between the longitudinal direction of the inner housing and the longitudinal direction of the outer housing is permanently fix, i.e., is no longer adjustable or changeable.

For example, the adjusting elements may be permanently fixed for this purpose, e.g., glued, clamped, screwed, or the like. It may also be contemplated that the outer housing and the inner housing have one or more connection points, where or by which the inner housing can be permanently connected to the outer housing, e.g. by gluing, clamping, screwing, or the like. It may furthermore be contemplated that the adjusting elements are removable or are removed once the outer housing has been permanently connected to the inner housing.

In one embodiment, the inner housing has a fastening portion which is radially fastened to the surrounding outer housing in a form-fitting manner. Furthermore, the inner housing has an adjustment portion that is radially spaced from the surrounding outer housing and is adapted to assume the different inclinations relative to the longitudinal direction of the outer housing. The inner housing may thus have a fastening portion and an adjustment portion along the longitudinal direction, wherein the fastening portion is fixed relative to the outer housing and the adjustment portion is inclinable relative to the outer housing and is defining the longitudinal direction of the inner housing. Nevertheless, the inner housing may be provided in one piece and/or may be made of an elastic material.

The light source or the light guide can be held fixed or can be fixed permanently in particular in the adjustment portion.

Furthermore, the inner housing may have an elastically deflectable bending portion, in particular between the fastening portion and the adjustment portion. The bending portion may have a thinner wall thickness than the fastening portion and/or the adjustment portion. Due to the elastic deflection of the bending portion, it may be possible to adjust the different inclinations between the longitudinal direction of the inner housing and the longitudinal direction of the outer housing.

In particular, a spacing may exist in the range of the bending portion between the outer wall of the light guide and/or an optical element inserted in the bending portion and the inner wall of the inner housing. Due to this spacing, a volume is defined as a cavity that can be filled with ambient atmosphere, but also with any desired media, for example liquids and/or polymers, which may in particular be adapted to the refractive index of the light guide and/or the aforementioned optical element and/or may have refractive indices that differ from that of the light guide and/or optical element. Due to this volume, referred to as the adjustment range below, it is possible to easily deform the inner housing in the range of the bending portion. If, in particular, a light guide is mounted in the inner housing, the inner wall of the inner housing in the bending portion will not rub against the outer wall of the light guide during the adjustment due to the existence of the adjustment range. As a result, damage to the light guide is largely prevented on the one hand, and on the other hand, adjustment is simplified since no force has to be applied against the frictional forces.

For all embodiments, the material of the inner housing, at least in the bending portion, is advantageously selected such that the bending portion can be elastically reversibly deformed. Thus, an elastic restoring force is exerted by the bending portion, which tends to restore the initial parallel position of the inner housing. During the adjustment, the restoring force acts against the force that is applied by the respective adjusting element and/or the respective adjustment elements. Thus, an accurate adjustment is enabled. Particularly advantageously, these described measures may cause the inner housing to always contact at least one adjusting element during the adjustment.

Likewise for all corresponding embodiments, the wall of the inner housing is advantageously made thinner in the range of the bending portion than in the adjustment portion or the fastening portion. On the one hand, this promotes favorable bendability. On the other hand, the reduction of the wall thickness in the bending portion causes suppression of undesirable tilting of the exit optics. Actually, if the inner housing is bent in the bending portion during the adjustment, the plane of the exit optics, e.g. collimator optics, and/or the exit face of the light guide will possibly be displaced and/or tilted due to the deformation of the inner housing. This can be in particular illustrated by considering the effects, when the inner housing is bent. In this case, the length of the inner housing will be increased geometrically on the outer side of the curvature and will be reduced on the inner side of the curvature. As a consequence, the material of the inner housing is stretched on the outer side of the curvature and the material of the inner housing is compressed on the inner side. This may cause tilting of the plane of the exit optics, including the end face of a light guide, towards the outer side of the curvature, in particular if this compression does not result in deformation of the material but in local compression. The same applies to the stretching of the material on the outer side of the curvature.

Such tilting may have an adverse effect on the optical properties of the entire assembly and/or may even render unusable the assembly. Due to the reduced wall thickness in the bending portion, the compression and/or stretching of the inner housing during the bending caused by the adjustment is concentrated in the bending portion where the compression and/or stretching is promoted so to say, because of the reduced wall thickness, and in particular causes the material of the inner housing to be stretched and/or compressed in this range according to the amount geometrically required by the bending. Particularly advantageous is a reversible stretching and/or compression.

A further advantage of this measure is that mechanical stress, in particular tensile and/or compressive stress as caused by the adjustment and the bending, is kept away from the exit optics including the end face of a light guide. Such mechanical stress may lead to density variations within the optical element of the exit optics and/or in the vicinity of the end face of the light guide and may thus also have an adverse effect on the optical properties of the entire assembly.

The invention furthermore relates to a method for aligning a light beam that is exiting from a light source or a light guide along an optical axis.

According to the method, an assembly is provided comprising an outer housing and an inner housing that is arranged at least partially inside the outer housing and is adjustably mounted to the outer housing.

The light source or the light guide is inserted into the inner housing, completely or partially, is positioned, if necessary, along the longitudinal direction according to the respective requirements, and is then fixed to the inner housing so that the optical axis of the light beam is fixed relative to the longitudinal direction of the inner housing. Preferably, the light source or the light guide is also fixed axially, i.e. against displacement along the longitudinal direction of the inner housing.

The inner housing is furthermore adjusted relative to the outer housing by adjusting a specific inclination between the longitudinal direction of the inner housing and the longitudinal direction of the outer housing, in particular after the light source or the light guide has been fixed to the inner housing. Thus, the optical axis of the light beam is aligned relative to the longitudinal direction of the outer housing.

Preferably, the alignment of the optical axis of the light beam relative to the longitudinal direction of the outer housing is verified using optical tools, e.g. on an optical bench, before, while and/or after the inner housing is being and/or has been adjusted relative to the outer housing. Such verifying is in particular performed after the light source or the light guide has been fixed to the inner housing.

It may be contemplated that the inner housing is permanently connected to the outer housing so that the adjusted inclination between the longitudinal direction of the inner housing and the longitudinal direction of the outer housing remains permanently fixed after the inner housing has been adjusted relative to the outer housing, in particular after the alignment of the optical axis of the light beam relative to the longitudinal direction of the outer housing has been verified.

In order to adjust the inner housing relative to the outer housing, it may in particular be possible to adjust one or more adjusting element(s). The one or more adjusting element(s) may be removed once the inner housing has been permanently connected to the outer housing.

As described above, a beam shaping optical system such as a lens or a lens system may be mounted to the inner housing, in particular for focusing or collimation.

After the light source or the light guide has been inserted into the inner housing, it may be displaced along the longitudinal direction of the inner housing until a specific beam shaping of the light beam is caused, in particular a desired focusing or collimation of the light beam, before the light source or the light guide is fixed to the inner housing.

Before, while and/or after the light source or the light guide is being and/or has been displaced along the longitudinal direction of the inner housing, the beam shaping of the light beam may be verified, in particular using optical tools, e.g. on an optical bench. In this way, it can be verified whether a desired beam shaping is achieved.

Further, the light source or the light guide can be permanently connected to the inner housing after the light source or the light guide has been displaced along the longitudinal direction of the inner housing, in particular after the beam shaping of the light beam has been verified.

BRIEF DESCRIPTION OF THE DRAWINGS

The invention will now be described in more detail by way of exemplary embodiments and with reference to the figures, wherein the features of the different exemplary embodiments can be combined with one another.

DETAILED DESCRIPTION

Figure 1:
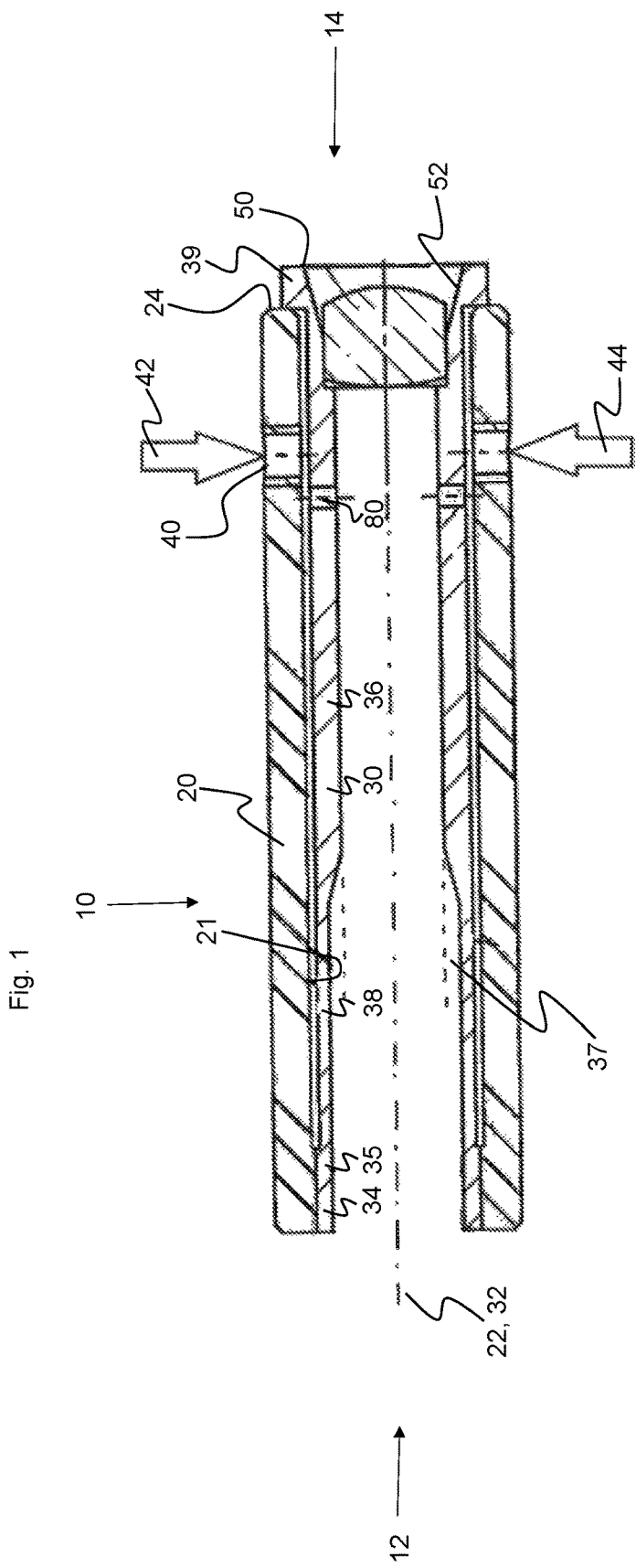
FIG. 1 is a sectional view of an assembly for beam shaping and beam alignment.

Referring to FIG. 1, a beam aligning assembly 10 comprises an outer housing 20 in the form of an outer sleeve, and an inner housing 30 in the form of an inner sleeve adjustably arranged inside thereof. Outer housing 20 and inner housing 30 each have a tubular shape that opens to both ends, and define a longitudinal direction 22 and 32, respectively.

Figure 2:
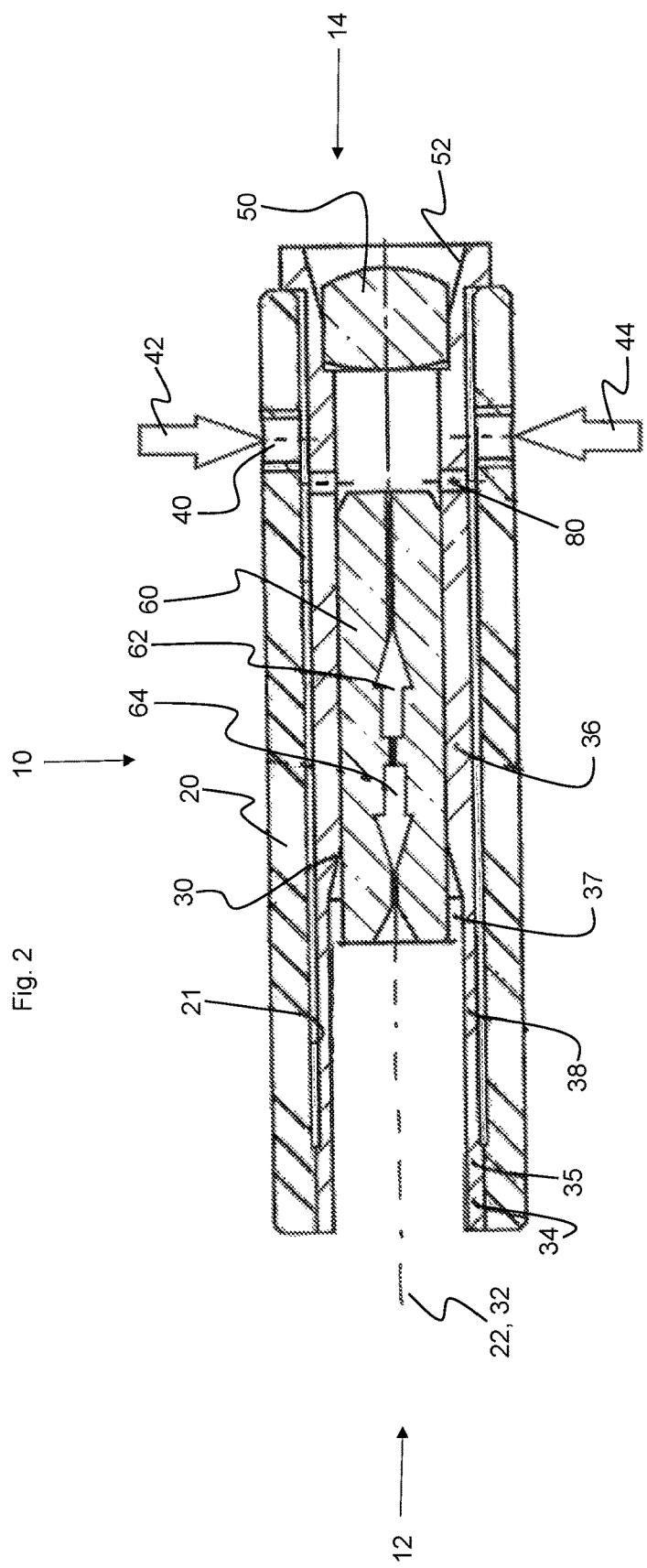
FIG. 2 shows the assembly of FIG. 1 with a light source.
Figure 3:
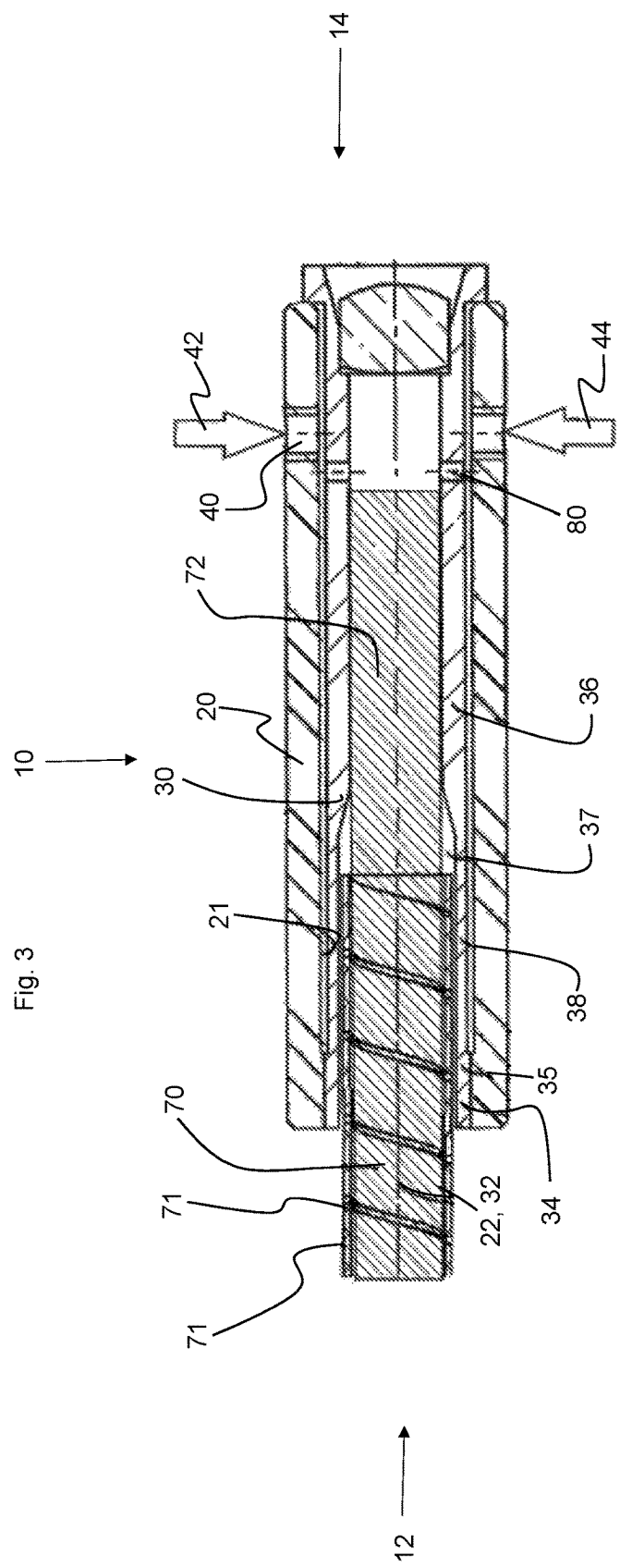
FIG. 3 shows the assembly of FIG. 1 with a light guide.

Referring to FIG. 2 and FIG. 3, the beam aligning assembly 10 is configured as an adjustable accommodation means for a beam source or an optical fiber to be aligned. Accordingly, a light source 60 (see FIG. 2) or a light guide 70 (see FIG. 3) can be inserted into the tubular beam aligning assembly 10 and into inner housing 30. Light source 60 (e.g., a diode laser) or light guide 70 (e.g., an optical fiber, optionally with an enclosing ferrule in which the optical fiber may be adhesively bonded) is first inserted into the inner sleeve, axially adjusted, and fixed to the inner sleeve, e.g. glued or clamped thereto. Then, inner sleeve 30 can be aligned relative to outer sleeve 20.

Referring again to FIG. 1, the inner housing 30 has a fastening portion 34 at a first distal end 12 along longitudinal direction 32, which fastening portion is designed as a circumferential collar 35 in the present example and is fixed radially to the inner wall 21 of outer housing 20. The inner accommodation means, i.e. the inner sleeve, is therefore mounted in a form-fitting manner in the outer sleeve on one end thereof over a short length, and is connected thereto, e.g., welded, glued, soldered, clamped, screwed, or the like. On the other end, the inner sleeve can be aligned (tilted) within the outer sleeve using a plurality of radially arranged adjusting elements 40.

Accordingly, on the side of a second distal end 14 along longitudinal direction 32 the inner housing 30 has an adjustment portion 36 which is spaced apart from outer housing 20 or the inner wall thereof, i.e. is cantilevered in the outer housing. Inner housing 30 is therefore inclinable within the range of adjustment portion 36 relative to outer housing 20. In the present example, inclinations ranging from zero to a few degrees are intended, and inclinations can be intended in all directions perpendicular to the longitudinal axis 32, in particular if the beam aligning assembly 10 has a circular cross-sectional shape perpendicular to longitudinal axis 32.

While in the initial state the longitudinal direction 32 of inner housing 30, which is defined by adjustment portion 36, and the longitudinal direction 22 of outer housing 20 are advantageously aligned in parallel to one another, the two longitudinal directions 22, 32 are set into a tilted position to each other by inclining the adjustment portion 36.

In order for the adjustment portion 36 of the inner housing 30 to be easily inclinable, the inner housing 30 includes a bending portion 38 which is arranged between adjustment portion 36 and fastening portion 34. In the range of bending portion 38, the wall of the inner housing is thinner than in the adjustment portion 36 and fixing portion 34. Like adjustment portion 36, the bending portion and is spaced from the surrounding outer housing 20, i.e. is not connected thereto, and in particular defines the aforementioned adjustment range 37, which causes a spacing between inner housing 30 and an inserted light source 60 or light guide 70. When the inner housing 30 is being inclined relative to the outer housing 20, the inner housing 30 will be bent elastically in the range of bending portion 38. The tilting is thus caused by elastic bending of the thin-walled portion of the inner sleeve. Thereby, an elastic restoring force is exerted by bending portion 38, which tends to restore the inner housing 30 back in the parallel initial position.

In order to adjust the alignment of adjustment portion 36, adjusting elements 40 are inserted in the outer housing 20. By means of these adjusting elements 40 which may be in the form of grub screws, for example, the inner sleeve is aligned. As can be seen in FIG. 1, two adjusting elements 40 may be provided, which are arranged radially opposite to one another, in order to be able to incline the inner housing 30 along an axis perpendicular to longitudinal axis 32 in positive and negative directions 42, 44. Four radially arranged adjusting elements 40 may be provided in total, for example, in order to be able to incline the inner housing 30 in the plane perpendicular to the longitudinal direction 32 thereof along two linearly independent axes, both in positive and negative direction in each case.

Inner housing 30 protrudes from outer housing 20 at the second distal end 14 thereof, with a protrusion 39 in the form of a circumferential collar in the present example. Protrusion 39 slideably engages on the end face 24 of outer housing 20. The contact area between protrusion 39 of inner housing 30 and the end face 24 of outer housing 20 defines a connection area at which the inner housing 30 can be permanently connected to outer housing 20. By permanently connecting the adjusted inner housing 30 to the outer housing 20 it is possible to permanently fix a desired inclination of the two housings relative to one another. In particular, if the alignment is as desired (and has optionally been verified on an optical bench), the inner sleeve can be permanently fixed to the outer sleeve in the aligned state. This may be accomplished by laser welding, gluing, soldering, clamping, screwing, or the like, for example. Once the fixing has been completed, the adjusting elements 40 may optionally be removed.

On the side of second distal end 14, an optic 50 is inserted in the inner housing 30, which may in particular be configured as a collimator optic. In the illustrated example, optic 50 comprises a single lens (e.g. aspheric lens, grin lens). However, it is also possible to provide a system comprising a plurality of lenses, in particular a cemented system (e.g. achromat, triplet), and also a lens system comprising a plurality of lens groups. Multi-lens systems are usually achromatic or apochromatic and are corrected for several wavelengths, so that even multicolored light (laser light) can be collimated in high quality.

Optic 50 is supported in the inner housing by a lens holder 52, and in the present example the lens holder 52 is designed as a conical seat of the inner housing.

Referring again to FIG. 2 and FIG. 3, the beam alignment assembly 10 and the inner housing 30 are configured to accommodate and support a light source 60 or a light guide 70. For this purpose, the light source 60 or light guide 70 is inserted into the inner housing 30 along longitudinal direction 32, in the illustrated example starting from the side of first distal end 12. A light source 60 is usually completely inserted into inner housing 30, while a light guide 70 is partially inserted into inner housing 30, in particular the head 72 of the light guide.

Light source 60 or light guide 70 are in particular inserted into the adjustment portion 36 of the inner housing and can be moved along longitudinal direction 32 towards optic 50 (direction 62) or away from optic 50 (direction 64) in order to achieve a desired beam shaping. While the light source 60 or light guide 70 is positioned, the beam shaping achieved by optical system 50 can be verified. This may in particular be accomplished using optical means, e.g. on an optical bench.

Inside the adjustment portion 36, the light source 60 or light guide 70 engages the inner wall of inner housing 30 in form-fitting manner so that the optical axis of the light beam exiting from the respective light exit 61, 72 is fixed relative to the longitudinal direction 32 of inner housing 30. Here, small deviations from parallelism are quite possible; such deviations can be compensated by adjusting the inner housing 30. Favorably, an adjustment range 37 is provided in the bending portion 38 and in this example additionally in the fastening portion 34. Hence, there is a spacing between inner sleeve 30 and light guide 70, which extends along the bending portion 38 and fastening portion 34 up to distal end 12. In the present example, a tube 71 is installed in at least part of the adjustment range 37, surrounding and protecting light guide 70. Tube 71 may comprise a helical stabilizer 71', for example, in order to increase stiffness. Tube 70 is for instance inserted and fixed after the axial and radial adjustment and in particular functions as a mechanical protector of the light guide 70.

Once a desired beam shaping, e.g. collimation, is achieved, the light source 60 or light guide 70 can be permanently fixed to the inner housing 30. For this purpose, one or more openings (not shown) may be provided in the inner housing 30, through which the light source 60 or light guide 70 can be adhesively bonded to the inner housing. In addition, ventilation openings 80 are provided in the inner housing 30, which are intended for (high) vacuum applications.

A beam aligning assembly 10 is in particular useful for providing a collimator optic with collinear aligned beam. Applications for this include, e.g., position sensors for optical alignment of machine parts, holography, interferometric vibration analysis, or sensor applications in interferometry.

It will be apparent to the person skilled in the art that the embodiments described above are given by way of example and that the invention is not limited thereto, but can be varied in various ways without departing from the scope of the claims. Furthermore, it will be apparent that the features, regardless of whether they are disclosed in the specification, the claims, the figures, or otherwise, also individually define essential components of the invention, even if they are described in combination with other features.

What is claimed is:

1. An assembly for aligning a light beam that is exiting from a light source or from a light guide along an optical axis, comprising:
   an outer housing defining a longitudinal direction;
   an inner housing defining a longitudinal direction and being arranged at least partially inside the outer housing, the inner housing being configured to receive the light source or the light guide such that the optical axis of the light beam is fixed relative to the longitudinal direction of the inner housing; and
   a fastening portion that fastens the inner housing to the outer housing,
   wherein the inner housing is adjustably mounted to the outer housing such that a plurality of different inclinations is adjustable between the longitudinal directions of the inner and outer housings in order to align the optical axis of the light beam relative to the longitudinal direction of the outer housing,
   wherein the inner housing has an adjustment portion that is spaced apart from an inner wall of the outer housing and is adapted to assume the plurality of different inclinations relative to the longitudinal direction of the outer housing
   wherein the inner housing has an elastically deflectable bending portion arranged between, in the longitudinal direction of the inner housing, the adjustment portion and the fastening portion.

2. The assembly of claim 1, further comprising a lens or a lens system mounted in or on the inner housing so as to cause beam shaping of the light beam.

3. The assembly of claim 2, wherein the lens or lens system is configured to collimate the light beam.

4. The assembly of claim 1, wherein the inner housing is configured to receive the light source or the light guide at different positions along the longitudinal direction of the inner housing.

5. The assembly of claim 1, wherein the inner housing is configured to receive the light source or the light guide at a fixed position along the longitudinal direction of the inner housing.

6. The assembly of claim 1, further comprising an adjusting element that can be used to provide the plurality of different inclinations.

7. The assembly of claim 1, wherein the adjusting element, once set to a specific inclination of the plurality of different inclinations, permanently connects the inner and outer housings at the specific inclination.

8. The assembly of claim 1, wherein the plurality of different inclinations are adjustable by deflecting the bending portion.

9. The assembly of claim 1, wherein the inner housing has a wall that is thinner in a region of the bending portion than in a region of the adjustment portion and/or in a region of the fastening portion.

10. The assembly of claim 9, wherein the wall is stretchable and/or compressible in the longitudinal direction of the inner housing in the region of the bending portion in order to reduce deviations of the light exit plane of the light guide or of the light source from a plane perpendicular to the longitudinal direction of the inner housing.

11. A method for aligning a light beam that is exiting from a light source or from a light guide along an optical axis, comprising:
    providing an assembly having an outer housing and an inner housing arranged at least partially inside the outer housing and adjustably mounted to the outer housing;
    inserting the light source or the light guide into the inner housing;
    fixing the light source or the light guide to the inner housing at a fixing portion so that the optical axis of the light beam is fixed relative to the longitudinal direction of the inner housing; and
    adjusting an adjusting element to adjust the inner housing relative to the outer housing by bending a wall portion of the inner housing between the fixing portion and the adjusting element to provide a specific inclination between the longitudinal direction of the inner housing and the longitudinal direction of the outer housing in order to align the optical axis of the light beam relative to the longitudinal direction of the outer housing.

12. The method of claim 11, further comprising verifying alignment of the optical axis of the light beam relative to the longitudinal direction of the outer housing while and/or after the inner housing is and/or has been adjusted relative to the outer housing.

13. The method of claim 11, further comprising permanently fixing the inner housing to the outer housing after adjusting the inner housing relative to the outer housing.

14. The method of claim 13, wherein the method further comprises removing the adjusting element after the step of permanently fixing the inner housing to the outer housing.

15. The method of claim 11, wherein the step of inserting the light source or the light guide into the inner housing comprises displacing the light source or the light guide along the longitudinal direction of the inner housing until a specific beam shaping of the light beam is caused.

16. The method of claim 15, comprising verifying the specific beam shaping while and/or after displacing the light source or the light along the longitudinal direction of the inner housing.

17. The method of claim 16, wherein the step of fixing the light source or the light guide to the inner housing comprises permanently fixing the light source or the light guide to the inner housing.

* * * * *